(12) United States Patent
Szajnowski

(10) Patent No.: US 6,765,533 B2
(45) Date of Patent: Jul. 20, 2004

(54) LOCALIZATION OF A SIGNAL EMITTING SOURCE

(75) Inventor: Wieslaw J Szajnowski, Guildford (GB)

(73) Assignee: Qinetiq Limited, Farnborough (GB)

( * ) Notice: Subject to any disclaimer, the term of this patent is extended or adjusted under 35 U.S.C. 154(b) by 0 days.

(21) Appl. No.: 10/239,407
(22) PCT Filed: Mar. 21, 2001
(86) PCT No.: PCT/GB01/01204
§ 371 (c)(1),
(2), (4) Date: Oct. 1, 2002
(87) PCT Pub. No.: WO01/71374
PCT Pub. Date: Sep. 27, 2001

(65) Prior Publication Data
US 2003/0112183 A1 Jun. 19, 2003

(30) Foreign Application Priority Data
Mar. 23, 2000 (GB) .............................................. 0006893

(51) Int. Cl.⁷ ................................................. G01S 3/02
(52) U.S. Cl. ...................................... 342/465; 342/463
(58) Field of Search ................................. 342/450, 451, 342/457, 463, 465

(56) References Cited

U.S. PATENT DOCUMENTS

| 4,385,301 A | 5/1983 | Tricoles et al. |
| 4,494,119 A | 1/1985 | Wimbush |
| 5,293,642 A | 3/1994 | Lo |
| 5,786,791 A | 7/1998 | Bruckert |
| 5,926,765 A | 7/1999 | Sasaki |

FOREIGN PATENT DOCUMENTS

GB  2311697 A  10/1997

*Primary Examiner*—Dao Phan
(74) *Attorney, Agent, or Firm*—Nixon & Vanderhye P.C.

(57) ABSTRACT

A source localising method comprises the steps of measuring the power received by a set of sensors and selecting N measurements from respective sensors, where N is an even number and at least four. N−1 different direct power ratios are constructed each derived from the N power measurements, with different numerators and denominators derived from respective halves of the measurements in each case. The construction of N−1 direct power ratios is facilitated by the use of a suitably constructed Hadamard matrix. Each direct power ratio may be converted with a logarithmic transformation into a linear combination of measured powers.

20 Claims, 3 Drawing Sheets

LOCALIZATION OF A SIGNAL EMITTING SOURCE

This application is the US national phase of international application PCT/GB01/01204 filed 21 Mar. 2001, which designated the US.

BACKGROUND OF THE INVENTION

1. Field of the Invention

This invention relates to a method and apparatus for passive localisation of a source that emits a signal, and particularly but not exclusively for passive localisation of a radar or radio transmitter.

2. Discussion of Prior Art

The best known method for passive localisation of a signal emitting source is based on determining a bearing line, or direction of arrival, from each of several non-collocated sensors dispersed over some surveillance area of interest. When there are no measurement errors, all bearing lines will intersect at one point representing the source location. In practice, errors are always present and the source location is estimated by exploiting one of the many algorithms developed during the last sixty years.

Other known methods to localise a signal emitting source exploit various relationships between parameters of signal replicas received at different suitably positioned sensors. For example, when the speed of signal propagation is known, it is possible to localise a source by determining the relative delays between signals intercepted by several sensors whose positions are known. In some cases it is also possible to determine the source location by utilizing information contained in the phase of signals received by non-collocated sensors with known positions. When there is some relative movement between a source and sensors, the signal phase varies in time to produce the well-known Doppler effect. An example of such a method is described in U.S. Pat. No. 4,385,301.

The problem with the above techniques is that there are a number of applications where neither of the above methods can be used. Another method applies the concept of the circle of Apollonius. The power received at each energy detector is determined. The locus of a point X is determined whose distance from two of said sensors satisfy the equation $P_1/P_2 = d_2^2/d_1^2$ where $P_1$ and $P_2$ are respectively the power received at sensors 1 and 2 respectively and $d_2$ and $d_1$ are the distances of the points on the locus from sensors 2 and 1 respectively. The locus of a point Y is determined whose distance from two of said sensors satisfy the equation $P_3/P_2 = d_2^2/d_3^2$ where $P_3$ and $P_2$ are respectively the power received at sensors 3 and 2 respectively and $d_2$ and $d_3$ are the distances of the points on the locus from sensors 2 and 3 respectively. The intersect of said loci is where the power source is located. Three different ratios of power values measured by the sensors $S_1$, $S_2$ and $S_3$ determine three circles. The source is located at the point where the three circles intersect. This is shown in FIG. 1 and described in U.S. Pat. No. 4,494,119.

A straightforward application of the concept of circle of Apollonius to source localisation problems is difficult for a number of reasons. When the number of power measurements is equal to N, the number of all possible ratios of two powers is equal to $N(N-1)/2$. Since the number of independent power measurements is only N, all the $N(N-1)/2$ ratios cannot provide independent information. Therefore, a localisation algorithm based on ratios of only two powers cannot be computationally efficient. In some ESM applications a single moving sensor can provide more than 1000 power measurements which will define almost half a million circles. Additionally, the location estimate is derived from the geometrical construction of a circle of Apollonius. Therefore, any attempt to find a maximum likelihood or Bayesian estimate of location will have to be based on advanced concepts of stochastic geometry and geometric probability. The solution may be too difficult to implement with a hardware digital processor.

SUMMARY OF THE INVENTION

The inventor has determined that all measured (also called direct) powers can be used in each ratio to determine the location of a source. In order to mitigate the problems with the prior art, in this invention, when the number of power measurements made at different sensor positions is N, the number of ratios of power employed for localisation is equal to N-1, and exactly all powers appear in each such ratio.

The invention also enables the localisation of a signal emitting source by suitable processing of intercepted signals which may have been corrupted by noise and other interference.

The invention comprises a method of locating a signal emitting source comprising the steps of:

a) making measurements of power received from the source by a set of sensors and selecting N such measurements from respective sensors, where N is an even number and at least four;

b) constructing N-1 direct power ratios each derived from the N power measurements, each ratio having a numerator which is the product of a respective sub-set of N/2 of the N power measurements and a denominator which is the product of the N/2 outside such sub-set in each case; and; and c) calculating the source location from the direct power ratios.

Preferably, the location of the signal emitting source is calculated by comparing the direct power ratios with the respective ratios predicted for each of a plurality of hypothesized source locations. The signal emitting source is calculated by:

a) calculating predicted power ratios for each of a plurality of hypothesized source locations;

b) comparing the direct power ratios with the predicted power ratios; and identifying the hypothesized source location having the smallest discrepancy between the predicted power ratios and the direct power ratios. An estimated source location is such a hypothesized location where a suitably defined measure of discrepancy between the measured and predicted ratios achieves a minimum value.

The combinatorial problem of identifying and forming all the ratios is preferably facilitated by the use of a suitably constructed Hadamard matrix.

Preferably, each direct power ratio is converted with a logarithmic transformation into a linear combination of measured powers. The logarithmic transformation converts the products into sums and the ratios into differences. The Hadamard transformation facilitates the combinatorial problem of constructing a complete set of direct power ratios by exploiting the properties of the Hadamard Transform. Furthermore, the logarithmic transformation converts direct power ratios into random variables with approximately Gaussian distribution, irrespective of the nature of intercepted signals.

Preferably, the measure of discrepancy between measured (or direct) and predicted power ratios utilizes the absolute difference between the logarithms of the respective ratios.

The invention may preferably be utilised in conjunction with standard electronic support measure (ESM) system which provides bearing estimates but also using available information about the power of intercepted signals for localisation purposes. Incorporating this information in an appropriate manner into the localisation algorithm will result in a significant reduction of localisation errors. Similar performance enhancement can also be achieved, at least in some cases, in other applications (e.g., surveillance or 'search and rescue' missions) concerning localisation and tracking of communication transmitters (e.g., mobile phones) with the use of compact power sensors.

BRIEF DESCRIPTION OF THE DRAWINGS

The invention will now be described with reference to the following drawings of which.

DETAILED DESCRIPTION OF EMBODIMENTS

Figure 1:
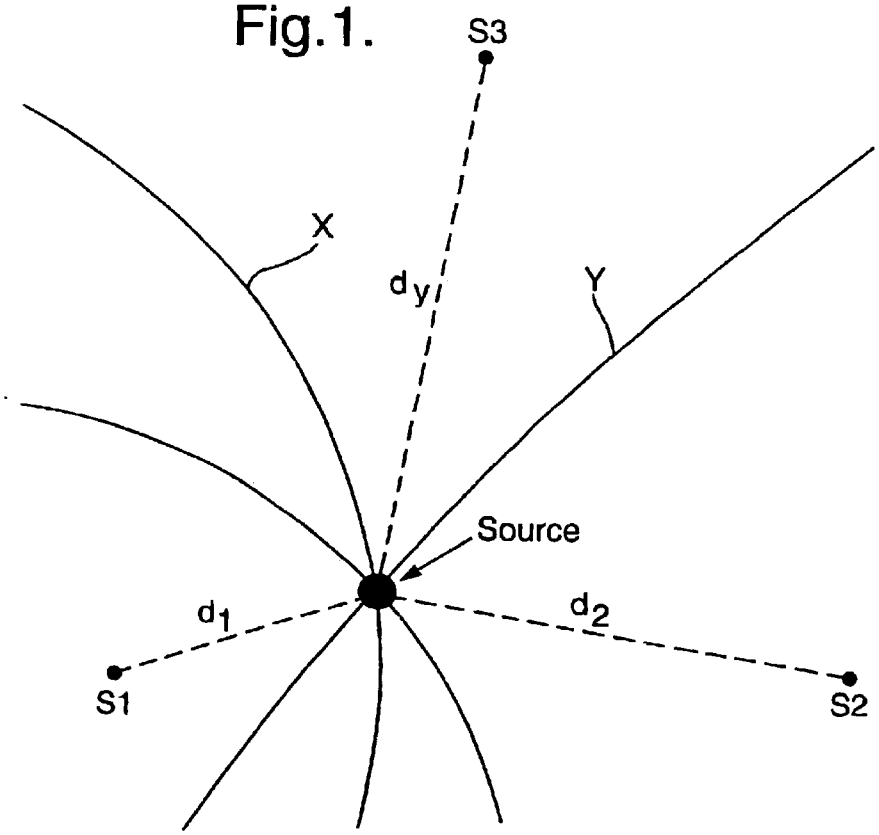
FIG. 1 shows a configuration where a signal emitted by a source is detected by three sensors and how localising a source is performed by the point of intersection of three circles of Apollonius determined from measurements provided by three non-collocated sensors.
Figure 2:
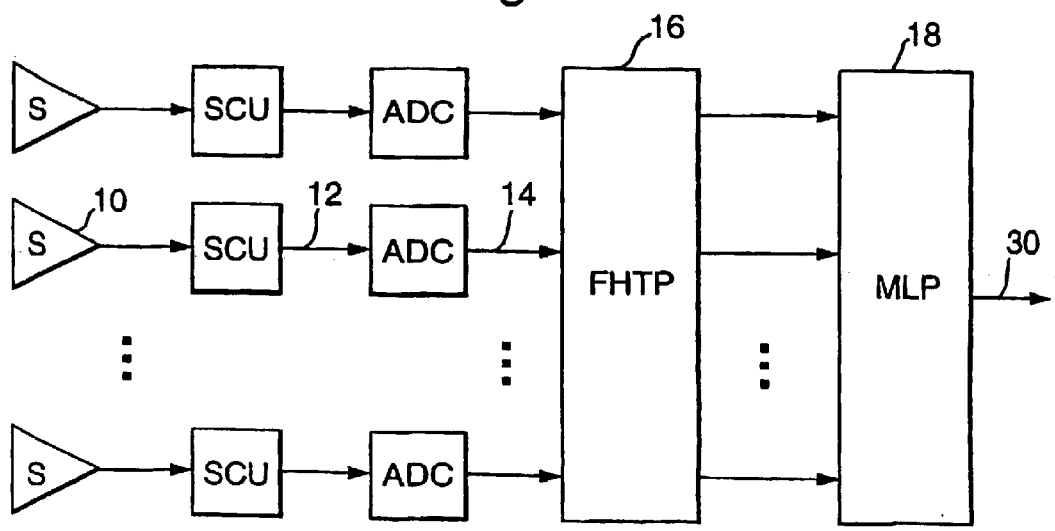
FIG. 2 is shows an example of a block diagram of a source localising apparatus in accordance with the invention.

FIG. 2 is a functional block diagram of a source localising apparatus which may be used for such a preferred implementation of the invention. A plurality N of sensors (S), each driving a signal conditioning unit (SCU) whose output is converted into a digital form by a logarithmic analogue-to-digital converter (ADC), a Fast Hadamard Transform processor (FHTP) and a Maximum Likelihood processor (MLP) providing an estimate of the source location at the output. Each SCU consists of a suitable preamplifier comprising means to identify and select a signal of interest and a circuit producing at the output of SCU an estimate of the rms value of the signal. The means used to identify and select a signal of interest comprises suitable pulse de-interleaving circuits and pulse discriminators. N inputs of the FHTP obtained from the ADCs can be regarded as a vector of the form $$q = (\ln r_1, \ln r_2, \ldots, \ln r_N)^T$$

where $r_i$, $i=1, 2, \ldots, N$, is the rms value of a signal intercepted by an i-th sensor S, and T denotes transpose. The FHTP 16 implements the multiplication of a suitable N×N Hadamard matrix $[H_N]$ and the vector q as follows $$v = [H_N] q$$

The components of a resulting vector v are supplied to the respective inputs of the MLP 18.

The signal from each of the N sensors may be electromagnetic or acoustic. The emission may be continuous, intermittent or pulsed. The signals from the N sensors may be obtained by employing less than N sensors and moving the sensors between different positions in order to obtain the number N of signals desired.

Preferably, the implementation of above multiplication is based on the Fast Hadamard Transform. It is known that a Hadamard matrix may exist when its order is 4L, where L is an integer. However, Fast Hadamard Transform is based on a subset of Hadamard matrices of order $2^M$, where M is an integer. The construction of suitable Hadamard matrices and the algorithms of the Fast Hadamard Transform are well known to those skilled in the prior art.

Preferably, the Hadamard matrix is used in its normalised form, i.e., its first row and first column consist entirely of +1 elements. In this case, the first component of the output vector v is discarded, and the remaining components, numbered from 1 to (N−1), are supplied to the MLP. For example, an (j−1)-th component of output vector v is determined as follows $$v_{j-1} = h_{j1} \ln r_1 + h_{j2} \ln r_2 + \ldots + h_{jN} \ln r_N, j=2, 3, \ldots, N.$$

where $h_{jk}$ is an element of an N×N Hadamard matrix $[H_N]$. As seen, the number of components of the resulting vector v is equal to N−1. The operations performed by the FHTP 16 are explained below by considering the following example.

EXAMPLE 1

The example illustrates the operations carried out by the FHTP 16 in the case of eight measurements (i.e., N=8). Input vector q supplied to the FHTP 16:

$$q = (\ln r_1, \ln r_2, \ldots, \ln r_8)^T$$

An 8×8 normalised Hadamard matrix $[H_8]$:

$$[H_8] = \begin{matrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{matrix}$$

Output vector v produced at the outputs of the FHTP $$v = (v_1, v_2, \ldots, v_8)^T$$

First component of output vector v:

$$v_1 = \ln r_1 - \ln r_2 + \ln r_3 - \ln r_4 + \ln r_5 - \ln r_6 + \ln r_7 - \ln r_8$$

or $$\ln [(r_1 r_3 r_5 r_7)/(r_2 r_4 r_6 r_8)]$$

Last component of output vector v:

$$v_7 = \ln r_1 - \ln r_2 - \ln r_3 + \ln r_4 - \ln r_5 + \ln r_6 + \ln r_7 - \ln r_8$$

or $$v_7 = \ln [(r_1 r_4 r_6 r_7)/(r_2 r_3 r_5 r_8)]$$

As seen, each component of the output vector v is formed by utilizing all eight measurements. Because every Hadamard matrix is an orthogonal matrix, the components of the output vector v are uncorrelated. Furthermore, all the components of v have the same variance.

In most practical applications it can be assumed that the probability density function (pdf) of each component of a vector v produced by the FHTP is Gaussian. Because the components are uncorrelated, they are also independent, and their joint pdf is the product of individual pdfs. Therefore, the likelihood function of source location can be expressed as $$L(x, y) = [1/(s\sqrt{2\pi})]^{N-1} \prod_{i=2}^{N} \exp[-(v_i - v_i^+)^2/(2s^2)]$$

where (x, y) are the coordinates of a hypothesized location, $s^2$ is the unknown common variance, and $v_i^+$ is the predicted mean value of $v_i$. The method used to determine the values of $v_i^+$ is described in more detail in the following.

When the number of observations is not a multiple of four, there are two options for locating the power source. Either some of the observations are not used in the measurement so that N, the number of sensors where power is measured, is a multiple of four, or the group is partitioned to construct two subgroups the results of which are suitably combined, for example, by a weighted average. If the number of observations is 6 (A,B,C,D,E,F) then the subgroups may be (A,B,C,D) and (E,F) or (A,B,C,D) and (C,D,E,F). If the number of observation is 10 then the subgroups may be constructed from 8 and 2 observations or 8 and 4 observations. So, the subgroups may partially overlap which would reduce the efficiency of the measurement. It will be obvious to the person skilled in the art that other combinations of the observations will be suitable to effect location.

Figure 3:
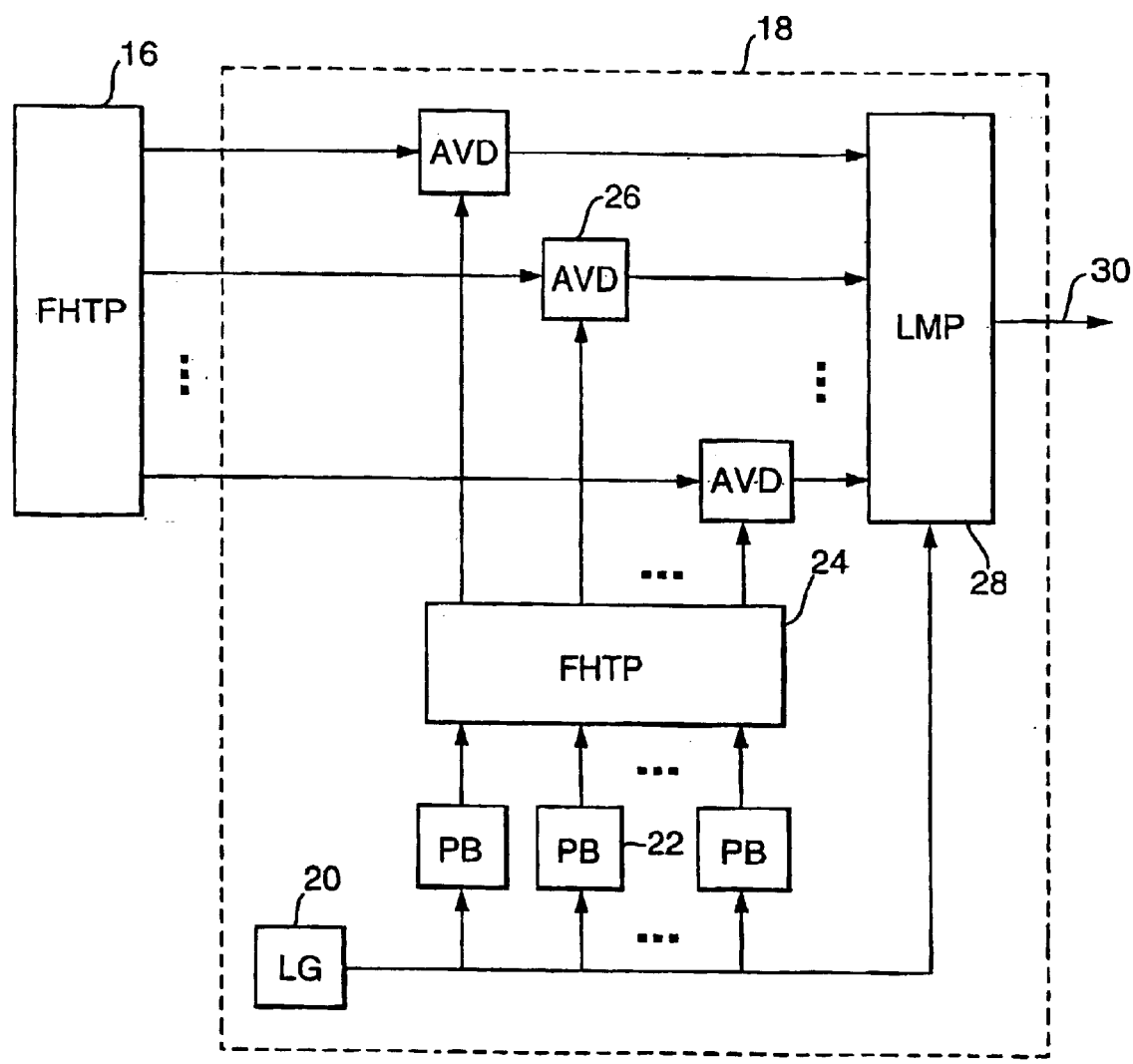
FIG. 3 is a block diagram of a maximum likelihood processor (MLP) of the apparatus of FIG. 2.

FIG. 3 is a block diagram of a Maximum Likelihood processor (MLP) of the apparatus. The MLP calculates at each of a predetermined plurality of locations (x,y) the value of a function derived from the likelihood L(x,y). Therefore, the MLP produces a surface spanned over a surveillance region of interest represented by the predetermined plurality of locations. The coordinates of such a point $(x_0, y_0)$, where L(x,y) achieves its maximum are selected as an estimate of the location of a signal emitting source. The MLP comprises a location generator (LG), a plurality of prediction blocks (PDs), a Fast Hadamard Transform processor (FHTP), a plurality of absolute value of difference blocks (AVDs) 26 and a likelihood mapping processor (LMP) 28.

The location generator (LG) 20 produces a sequence of hypothesized locations (x,y) to form a suitable grid representing a digitised surveillance region of interest. Grid forms based on quincunx or hexagonal sampling patterns are also possible.

Prediction blocks (PDs) 22 determine N distances $d_i$, i=1, ..., N, between each of N sensors (S) 10 and each grid location (x,y) and also calculate from a postulated signal propagation model N corresponding "pseudo-measurements" ln $r^+i$, i=1, 2, ..., N. For example, for a spherical propagation model an i-th pseudo-measurement is of the form $$\ln r^+_i = -\ln d_i$$

As a result, N inputs of the FHTP 24 are driven by the following vector comprising pseudo-measurements $$q^+ = (\ln r^+_1, \ln r^+_2, \ldots, \ln r^+_N)^T$$

The FHTP 24 implements the multiplication of a suitable N×N Hadamard matrix $[H^N]$ and the input vector $q^+$ as follows $$v^+ = [H^N]q^+$$

Both FHTPs, 16 and 24, use the same Hadamard matrix for their respective operations. Each component of the resulting vector v+ is supplied to the respective input of an absolute value of difference block (AVD) whose other input is driven by the corresponding component of the vector v supplied by the FHTP. As a result, for each grid location (x,y) the AVDs produce the following sequence $$|v_1 - v^+_1|, |v_2 - v^+_2|, \ldots, |v_{N-1} - v^+_{N-1}|$$

which is supplied to the Likelihood mapping processor (LMP). The LMP calculates the following function $$M(x,y) = \exp[-|v_i - v^+_i|^2]$$

for each grid location (x,y). The function M(x,y), called the probability map, represents the likelihood function L(x,y) in the sense that the global maxima of the two functions, L(x,y) and M(x,y), coincide. The coordinates of grid locations (x,y) and the corresponding values of the map M(x,y) are supplied to the output of the LMP. The coordinates of such a point $(x_0, y_0)$, where the map M(x,y) achieves its maximum are chosen as an estimate of the location of a signal emitting source. The maximum value achieved by M(x,y) in an ideal noise-free case is equal to unity.

The map M(x,y) described above utilizes a quadratic cost function, however, other forms of cost functions may lead to statistically more robust solutions. Various suitable cost functions are known to those skilled in the prior art.

Figure 4:
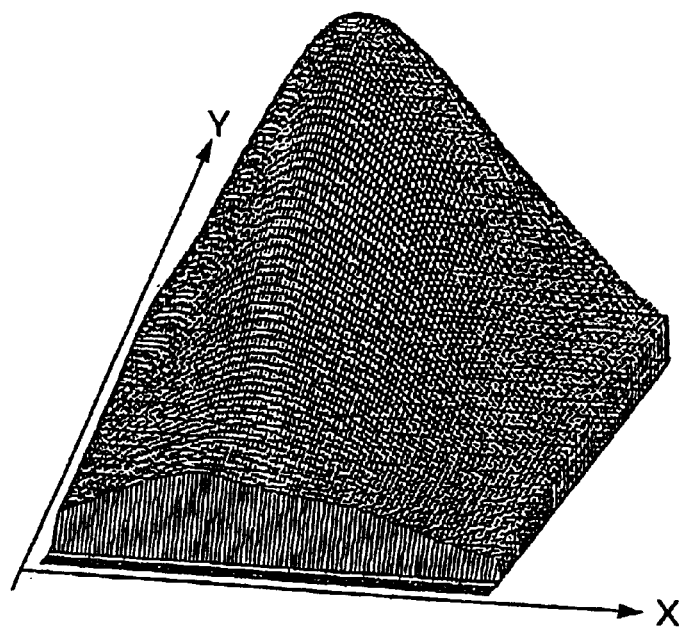
FIG. 4 shows an example of a probability map produced by the apparatus.
Figure 5:
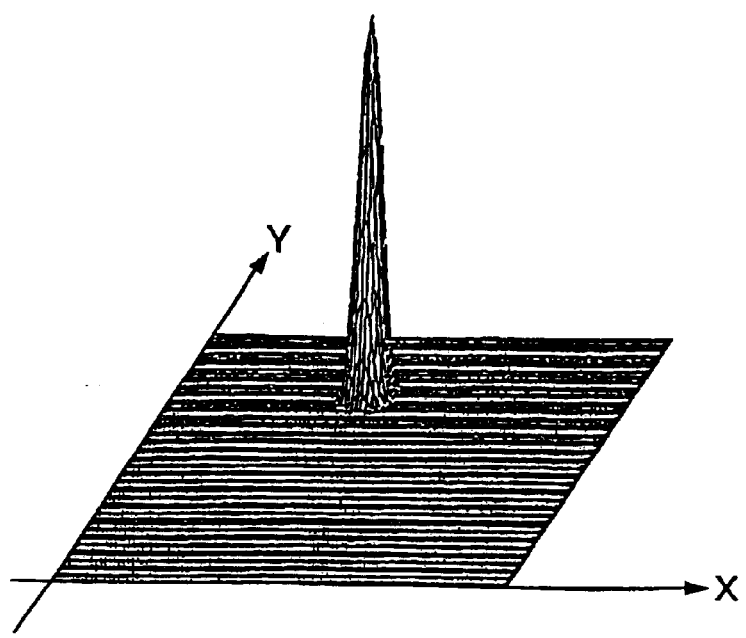
FIG. 5 shows an example of a probability map produced by the apparatus and further enhanced with the use of scaling and thresholding operations.

In many applications it is preferable to present all the calculated values of the map M(x,y) because the values are related to the probability that a source is located at a given grid point. Therefore, the entire map can be combined in a suitable manner with other similar maps obtained from other source localisation systems. FIG. 4 shows an example a probability map M(x,y) obtained by processing information provided by eight sensors. It has been found that in order to enhance the perception of the map and to facilitate source localisation, it is helpful to transform the map by utilizing a suitable nonlinear function followed by a thresholding operation. FIG. 5 shows an example of such enhanced probability map M(x,y).

The technique described above can also be use to enhance known techniques of detecting energy sources. Conventional submarine detecting systems uses a set of sonobuoys. Conventional techniques do not exploit directly the power of intercepted signals but they derive a bearing estimate from the received signals. If used in conjunction with the technique described herein, the localisation accuracy will be increased and some localisation ambiguities removed when the information about the signal power has been utilized by localisation procedures.

Yet another application is the localisation of an ion beam within a flight tube of an accelerator, for example, an ion implanter. In this case, moving charged particles induce time-varying charges on a set of suitably shaped sensing electrodes positioned around the beam. Signals derived from the induced charges can then be exploited for beam localisation purposes. A similar technique can be employed for localising a buried power cable by suitably processing signals induced by an electromagnetic field associated with the cable.

The equations given in the foregoing description for calculating quantities and results for the purposes of this invention can clearly be evaluated by an appropriate computer program recorded on a carrier medium and running on conventional computer system apparatus. Such a program is straightforward for a skilled programmer to implement without requiring invention, because the mathematical functions employed are well known computational procedures. Such a program and system will therefore not be described.

What is claimed is:

1. A method of locating a signal emitting source comprising the steps of:
   a) selecting N measurements of power from the source from measurements made by sensors positioned at difference locations, where N is an even number and at least four; and characterised by
   b) constructing N−1 direct power ratios each derived from the N power measurements, each power ratio having a numerator which is the product of the values of a subset comprising N/2 of the N power measurements and a denominator which is the product of the values of the remaining N/2 of the N power measurements falling outside the subset, each direct power ratio being derived from a difference combination of numerator and denominator power measurements; and
   c) calculating the source location from the (N−1) direct power ratios.

2. A method of locating a signal emitting source as claimed in claim 1 characterised in that the even number of N measurements is comprised from an odd total number of measurements and at least one of the odd total number of measurements is duplicated in the selection N.

3. A method as claimed in claim 1 characterised in that the construction of the (N−1) direct power ratios is facilitated by the use of a suitably configured Hadamard matrix.

4. A method as claimed in claim 1 characterised in that $N=2^M$ where M is and integer and a Fast Hadamard Transform is used to perform the multiplications.

5. A method as claimed in claim 1 characterised in that step c) comprises the step of:
   d) calculating predicted power ratios for each of a plurality of hypothesised source locations;
   e) comparing the direct power ratios with the predicted power ratios; and
   f) identifying the hypothesised source location having the smallest discrepancy between the predicted power ratios and the direct power ratios.

6. A method as claimed in claim 1, characterised in that each power ratio is converted with a logarithmic transformation into a linear combination of measured powers.

7. A method of as claimed in claim 6 characterised in that the measure of the discrepancy between the predicted power ratios and the direct power ratios utilises the absolute difference between the logarithms of the respective ratios.

8. A method as claimed in claim 7 characterised by;
   formulating a vector q where $q = (\ln r_1, \ln r_2, \ln r_i, \ldots \ln r_N)^T$ where T is transpose and r is the rms value of the power of a signal received at sensor i;
   multiplying the vector q by a Hadamard matrix, the vector v for each grid location, $v = [H_N] q$; where $v = (v_1, v_2, \ldots v_N)^T$
   formulating a vector $q^+$ where $q^+ = (\ln r^+_1, \ln r^+_2, \ldots \ln r^+_N)^T$, wherein $\ln r^+_i = -\ln d_i$ wherein $d_i$ is the distance of a sensor i from the signal emitting source;
   multiplying the vector $q^+$ by a Hadamard matrix, the vector $v^+$ for each grid location, $v^+ = [H_N] q^+$; where $v^+ = (v^+_1, v^+_2, \ldots v^+_N)^T$
   determining for each grid location the difference between v and $v^+$; and determining a point $(x_o, y_o)$ where the sum of the squared values of the difference calculated between v and $v^+$ achieves a minimum.

9. A method as claimed in claim 1 characterised in that the source emits one of an electromagnetic and an acoustic signal.

10. A method as claimed in claim 1 characterised in that the signal emission comprises one of a continuous, intermittent and pulsed signal.

11. A method as claimed in claim 1 characterised in that at least some of the N measurements are taken by moving at least one of the sensors between different positions, the location of which is determined.

12. A system for locating a signal emitting source according to the method of claim 1 comprising;
   a) means for selecting the N power measurements from the measurements made by the-sensors;
   b) means for constructing the (N−1) power ratios; and
   c) means for calculating the source location from the (N−1) direct power ratios.

13. A system as claimed in claim 12 characterised in that the means a), b), and c) are provided by a computer apparatus the computer apparatus being configured to receive measurements of power made by the sensors and being programmed to carry out the objectives a), b), and c).

14. A computer program for use in locating a signal emitting source and arranged to control a computer to perform the method of claim 1.

15. A carrier medium carrying the computer program of claim 14.

16. A method according to claim 1 in which the N selected measurements of power from the source are selected from a set of M measurements where M is greater than N.

17. A method according to claim 16 in which steps (a) and (b) are applied to each of two subsets of the M measurements and the source location is calculated from the direct power ratios derived from each of the two subsets.

18. A method according to claim 17 in which the two subsets have members in common.

19. A method according to claim 17 in which some of the measurements in the set of more than N measurements are not present in either of the two subsets.

20. A method according to claim 16 in which M is not a multiple of 4.

* * * * *